United States Patent [19]

Boryta et al.

[11] Patent Number: 4,867,956
[45] Date of Patent: Sep. 19, 1989

[54] ACTIVE OXYGEN-RICH COMPOUND AND PREPARATIVE METHOD

[75] Inventors: Daniel A. Boryta, Chester; Peter D. Wellhoffer, Philadelphia, both of Pa.

[73] Assignee: Cyprus Foote Mineral Company, Malvern, Pa.

[21] Appl. No.: 162,609

[22] Filed: Mar. 1, 1988

[51] Int. Cl.$^4$ .................... C01B 15/043; C01B 35/10
[52] U.S. Cl. ..................... 423/281; 423/230; 423/277; 423/279; 423/641; 252/184; 252/186.1
[58] Field of Search ............... 423/230, 277, 279, 281, 423/641; 252/186, 184

[56] References Cited

U.S. PATENT DOCUMENTS

| | | | |
|---|---|---|---|
| 1,978,953 | 10/1934 | McKeown | 423/281 |
| 2,491,789 | 12/1949 | Young | 252/186.43 |
| 2,851,334 | 9/1958 | Bretschneider | 423/281 |
| 2,937,998 | 5/1960 | Habernickel | 252/186.43 |
| 2,952,512 | 9/1960 | Cecil | 423/279 |
| 3,375,198 | 3/1968 | Rosenfelder | 423/281 |
| 3,405,068 | 10/1968 | Hilty | 423/279 |
| 3,446,588 | 5/1969 | Smith, Jr. | 423/641 |
| 3,847,837 | 11/1974 | Boryta | 252/184 |
| 3,920,803 | 11/1975 | Boryta | 252/186 |
| 3,975,500 | 8/1976 | Cash | 423/281 |
| 4,039,620 | 8/1977 | Netteland | 423/230 |
| 4,113,646 | 9/1978 | Gustafson | 252/184 |
| 4,185,960 | 1/1980 | Brichard et al. | 423/281 |
| 4,238,464 | 12/1980 | Gustafson | 423/279 |
| 4,620,970 | 11/1986 | Suzumori et al. | 423/579 |
| 4,681,748 | 7/1987 | Doetsch et al. | 423/279 |

OTHER PUBLICATIONS

J. O. Edwards et al., J. Amer. Chem. 91:5 1095–1103 (Feb. 26, 1969) "Some Chemical and Physical Properties of the Effervescent Magnetic Peroxyborates". The Pseudo-Superoxides.

Primary Examiner—Robert L. Stoll
Attorney, Agent, or Firm—Howson & Howson

[57] ABSTRACT

There is provided a novel active-oxygen rich lithium, boron, oxygen compound having the empirical formula $$LiOH \cdot 0.5Li_2O_2 \cdot LiBO_5$$

and a method for making the same.

14 Claims, No Drawings

ACTIVE OXYGEN-RICH COMPOUND AND PREPARATIVE METHOD

The present invention relates to a novel lithium, boron, oxygen compound especially useful as a source of oxygen and as a carbon dioxide absorber in life support systems and to a novel method of making the compound.

BACKGROUND OF THE INVENTION

Compounds and compositions capable of evolving oxygen and absorbing carbon dioxide are presently in demand for use in closed-circuit emergency breathing devices. Such compounds are a desirable alternative to heavy, bulky air or oxygen cylinders with canisters containing caustic alkali or soda lime for carbon dioxide removal. Compounds presently employed for this use include compounds of boron, oxygen and alkaline earth metals or alkali metals, especially sodium, potassium and lithium. For example, U.S. Pat. No. 4,238,464 discloses several air revitalization compounds or compositions, containing alkali metal or alkaline earth hydroxides, peroxides, superoxides and mixtures thereof. Lithium compounds disclosed in that patent include $(LiOH)_2.LiBO_5$; $(LiOH.Li_2O_2)_2.Li_3B_3O_{13}$, and $(Li_2O_2)_2.Li_2B_2O_8$. The compounds of that patent contain 10 to 22%, by weight, effervescent oxygen, with the lithium compounds containing 16 to 20% effervescent oxygen. The compounds also contain between 6 to 15%, by weight, of peroxide oxygen. The '464 patent also teaches that the preparation of the oxygen-generating compounds requires slow dehydration in very high vacuum at low temperatures. The major portion of the dehydration takes place at temperatures of 8° C. or lower and under an extremely high vacuum of only 3-5 microns Hg over a period of 8 to 10 days. Only after the reactions and dehydration are essentially complete is the temperature allowed to rise to 23°-25° C.

From the standpoint of commercial production the use of such high vacuums, and especially over many days, is undesirable. Furthermore, the maintenance of very low temperatures, especially in view of the exothermicity involved, over many days adds significant expense to commercial production.

There is thus a need in the art for compositions which are inexpensive, readily obtainable and stable, and have a high rate of carbon dioxide absorption and of oxygen evolution.

SUMMARY OF THE INVENTION

As one aspect of the present invention, a novel lithium, boron, oxygen compound is provided which is characterized by greater stability and greater effervescent oxygen capacity than presently available air revitalization materials. This compound is charcterized by the empirical formula: $LiOH.0.5Li_2O_2.LiBO_5$ Another aspect of the invention provides a method for making the novel compound of the invention at elevated temperatures relying on the exothermicity of the preparative reaction. Briefly described, the compound is prepared by dehydrating, at a temperature maintained at above about 30° C. to about 90° C. and at a vacuum below about 1000 microns Hg, an aqueous solution of boric acid, lithium hydroxide and hydrogen peroxide, in stoichiometric proportions to provide the above empirical formula. Dehydration continues until there remains a dry solid having a water of decomposition content of less than about 10%. This method obviates the need for an extremely high vacuum, extremely low temperatures and extended reaction times used in presently available methods for making air revitalization compounds.

These aspects and other advantages of the composition and method of the invention will become apparent from a consideration of the following detailed description and claims.

DETAILED DESCRIPTION OF THE INVENTION

The novel active oxygen-rich lithium, boron, oxygen compound of the present invention is characterized by the empirical formula $LiOH.0.5Li_2O_2.LiBO_5$ The compound of the present invention generates oxygen gas upon exposure to water vapor and carbon dioxide, as found in exhaled breath, and, therefore, is useful as an oxygen source and carbon dioxide absorber in self-contained rebreather devices. The compound contains 27-30%, by weight, effervescent oxygen, and is capable of generating 27 to 30% of its weight as oxygen, when it is exposed to water. Effervescent oxygen is most important for application in self-contained rebreather devices. The novel compound also contains about 10% peroxide oxygen, and will generate 35 to 40% of its weight as oxygen when exposed to water in the presence of a catalyst, such as $MnO_2$.

The compound has two oxygens having a valance greater than $-2$, that is $-1$, which provide the effervescent oxygen. These are two of the oxygens ($O_2{-}^1$) in the $LiBO_5$, which is an extremely unstable compound and cannot be made as such. In the present product, the $LiBO_5$ portion of the complex is stabilized by the $LiOH.0.5Li_2O_2$.

According to the method of the invention, an aqueous solution of lithium hydroxide, boric acid and hydrogen peroxide is prepared by dissolving the lithium hydroxide, boric acid and hydrogen peroxide in water. The concentration of reactants in terms of the empirical formula for the compound may range between about 10% and about 18%, by weight. The amount of water is that necessary to dissolve the materials. Since it is ultimately removed, excessive water is not desirable. Hydrogen peroxide may be present in excess in the reaction. The mixture is maintained at a constant temperature of about 0° C., that is, from about $-5$ to about 5° C., to avoid decomposition of the hydrogen peroxide. If the solution is left standing for an excess of 24 hours at 0° C., $LiBO_3.H_2O$ will precipitate. This compound contains 19% available oxygen as peroxide oxygen.

According to the present method the solution is then dyhydrated. The temperature of the solution is substantially instantaneously raised to a selected temperature range under a selected vacuum for a fairly short period of time. Significantly, the method employs a moderately elevated dehydration temperature which prevents the formation of an unstable hydroperoxide complex, $2LiOOH.LiOH.B(OOH)_3$ from occurring during dehydration. Strenuous cooling to maintain a temperature at 8° C. or lower is not used. The temperature is controlled to a range of from above 30° C. to about 90° C., preferably from at least about 50° C. to about 90° C. The temperature is maintained within that range until the stated end point is reached. This is most conveniently accomplished by spreading the solution as a layer on a warm surface adapted to control the temperature within the stated range. A warmed metal surface, preferably continuously moving, having a high thermal conductivity is preferred. The solution may be sprayed onto it or run as a sheet onto it or deployed in shallow trays or traylike indentations in the surface.

In addition, an extremely high vacuum of 3–5 microns Hg, although operable, is not required in this method. From the standpoint of commercial operation, vacuums of from about 100 to about 1000 microns Hg are suitable, with a vacuum between about 200 and about 500 microns being preferred. These are well within the capabilities of a commercial apparatus.

As the temperature of the solution rises from its cold initial stable condition to a temperature within the stated range according to this method, water is removed and the desired reaction takes place. A dry solid product is formed. When samples show a water of decomposition content of less than about 10%, the product is removed from the surface and cooled.

Another important aspect of the method is the relatively short length of time of preparation. The process of dehydration under the conditions of the method of the invention with formation of the desired compound as a dry solid having a water of decomposition content of less than about 10%, by weight lasts from about 1 to about 48 hours, depending upon the temperature and vacuum. In general, the higher the temperature and vacuum within the stated ranges, the shorter the time required.

The present invention will be more readily understood from a consideration of the following specific examples which are given for illustration only and are not intended to limit the scope of the invention in any way.

In these examples effervescent oxygen is measured by decomposing a sample in water alone at ambient temperature, and collecting and measuring by conventional means the volume of the evolved oxygen. The volume of oxygen measured is converted to standard temperature and pressure (STP) conditions from which the weight of oxygen evolved is calculated. Total active oxygen is measured by decomposing a dry sample in water containing $MnO_2$ at ambient temperature and collecting and measuring the volume of the evolved oxygen. Water of decomposition is measured by heating a sample at 550°–660° C. for approximately one-half to one hour to constant weight and collecting and weighing the evolved water by absorbing it in a trap containing magnesium perchlorate.

EXAMPLE I

A solution was prepared at 0° C. containing 15.5 g. of $H_3BO_3$, 31.5 g. $LiOH.H_2O$, 90.2 g. 49% $H_2O_2$ and 137.6 g. $H_2O$. The solution was sprayed onto a surface maintained initially at 60° C. and a vacuum applied. The surface was maintained at 60° C. for 22 minutes, then heated to 80° C. in 6 minutes and maintained at 80° C. for 32 minutes for a total dehydration time of 1 hour. The final vacuum was 19 microns Hg. The product contained 26.9 wt. % effervescent oxygen, 31.1 wt. % of total active oxygen and 9.1 wt. % of $H_2O$ of decomposition.

EXAMPLE II

A solution was prepared as in Example I and placed in a tray on a heated surface which was temperature programmed as follows: The temperature was increased from 25° C. to 90° C. over 24 hours and maintained constant at 90° C. for 24 hours. The vacuum was controlled to maintain a minimum pressure of 200 microns Hg. The dry product was analyzed as shown in Table I below.

Example III

A solution was prepared as in Example I and vacuum dried as in Example II except that the vacuum was controlled to maintain a minimum pressure of 500 microns Hg. The dry product was analyzed as shown in Table I below.

TABLE I

| | Found | | |
|---|---|---|---|
| Product Composition | Example II | Example III | Calculated |
| Wt. % effervescent oxygen | 27.0 | 27.9 | 22–33.6 |
| Wt. % total active oxygen | 37.2 | 36.2 | 38.7 |
| Wt. % Li as $Li_2O$ | 30.35 | 30.31 | 31.0 |
| Wt. % B as $B_2O_3$ | 24.28 | 24.34 | 24.1 |
| Wt. % $H_2O$ | 5.2 | 6.9 | 6.2 |

The calculation of 22% of Wt. % effervescent oxygen is based upon the reaction:

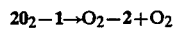

The calculation of 33.6% of Wt. % effervescent oxygen is based upon the reaction:

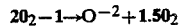

The calculations of 38.7 Wt. % total active oxygen and 6.2 Wt. % $H_2O$ were based upon the thermal decomposition reaction:

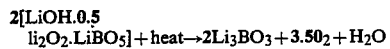

EXAMPLE IV

A carbon dioxide test was run to determine the efficacy of a tablet of the novel compound for $CO_2$ absorbance. Tablets were ¼ inches in diameter and ⅛ inch in height, having a sample weight of 21.3 grams. The test was conducted with a gas velocity of 345 cm/min. The absorption bed had a length of 10 cm and a volume of 78 cm³. The input gas had a relative humidity of 100%. The nitrogen gas contained 4% by volume $CO_2$. At breakthrough, $CO_2$ was present at 1% volume.

The results of the test are revealed in Table II.

TABLE II

| $CO_2$ Test Results (At Breakthrough) | |
|---|---|
| Grams $O_2$ generated/g. sample | 0.18 |
| Grams $CO_2$ absorbed/g. sample | 0.14 |
| Vol. Ratio $O_2/CO_2$ evolved/absorbed | 1.77 |
| (Metabolic volume ratio required: 1 ± 0.03) | |
| Pressure differential across absorbent during test, mm Hg | 0 |
| Average effluent volume % $O_2$ in nitrogen | 6.2 |
| Average effluent volume % $CO_2$ in nitrogen | 0.3 |

Numerous modifications and variations in practice of this invention are expected to occur to those skilled in the art upon consideration of the foregoing descriptions of preferred embodiments thereof. Such modifications are believed to be encompassed by the appended claims.

What is claimed is:

1. An active oxygen-rich lithium, boron, oxygen compound having the empirical formula:

$LiOH \cdot 0.5Li_2O_2 \cdot LiBO_5$

2. The method of preparing an active oxygen-rich lithium, boron, oxygen compound having the empirical formula $LiOH \cdot 0.5Li_2O_2 \cdot LiBO_5$ which comprises dehydrating, at a temperature maintained above about 30° C. to about 90° C. and at a vacuum between about 100 to about 1000 microns Hg, an aqueous solution of boric acid, and lithium hydroxide, in stoichiometric proportions to provide said empirical formula, and an excess hydrogen peroxide, for about 1 to about 48 hours to provide a dry solid having a water of decomposition content of less than about 10%.

3. The method of claim 2 wherein the dehydration temperature is maintained at least about 50° C.

4. The method of claim 2 wherein the dehydration vacuum is about 500 microns Hg.

5. The method of claim 2 wherein the dehydration vacuum is between about 200 and about 500 microns Hg.

6. The method of claim 3 wherein the dehydration vacuum is above about 100 microns Hg.

7. The method of claim 3 wherein the dehydration vacuum is about 500 microns Hg.

8. The method of claim 3 wherein the dehydration vacuum is between about 200 and about 500 microns Hg.

9. The method of claim 2 wherein said dehydrating step comprises spreading the solution, at a temperature between about −5° and about 5° C., as a layer on a warmed surface controlled to maintain a temperature at from about 30° C. to about 90° C. and under a vacuum between about 100 to about 1000 microns Hg.

10. The method of claim 9 wherein the temperature of said surface is maintained at least about 50° C.

11. The method of claim 9 wherein the dehydration vacuum is about 500 microns Hg.

12. The method of claim 9 wherein the dehydration vacuum is between about 200 and about 500 microns Hg.

13. The method of claim 10 wherein the dehydration vacuum is about 500 microns Hg.

14. The method of claim 10 wherein the dehydration vacuum is between about 200 and about 500 microns Hg.

* * * * *